(12) United States Patent
Zhang et al.

(10) Patent No.: US 11,031,855 B2
(45) Date of Patent: Jun. 8, 2021

(54) LINEAR VIBRATION MOTOR

(71) Applicant: AAC Acoustic Technologies (Shenzhen) Co., Ltd., Shenzhen (CN)

(72) Inventors: Tao Zhang, Shenzhen (CN); Lubin Mao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 2 days.

(21) Appl. No.: 16/526,968

(22) Filed: Jul. 30, 2019

(65) Prior Publication Data

US 2020/0044531 A1 Feb. 6, 2020

(30) Foreign Application Priority Data

Aug. 3, 2018 (CN) .......................... 201821255199.2

(51) Int. Cl.
*H02K 33/10* (2006.01)

(52) U.S. Cl.
CPC ..................................... *H02K 33/10* (2013.01)

(58) Field of Classification Search
CPC .............................. H02K 33/10; H02K 33/16
See application file for complete search history.

(56) References Cited

U.S. PATENT DOCUMENTS

| | | | | |
|---|---|---|---|---|
| 2005/0285454 | A1* | 12/2005 | Choi | B06B 1/045 310/14 |
| 2006/0001324 | A1* | 1/2006 | Won | H02K 33/16 310/81 |
| 2006/0266967 | A1* | 11/2006 | Miura | H02K 5/04 251/129.15 |
| 2010/0102646 | A1* | 4/2010 | Masami | H02K 33/16 310/29 |
| 2014/0232211 | A1* | 8/2014 | Katada | H02K 33/00 310/25 |

* cited by examiner

*Primary Examiner* — Naishadh N Desai
(74) *Attorney, Agent, or Firm* — W&G Law Group LLP

(57) ABSTRACT

The present disclosure provides a linear vibration motor, including a substrate having an accommodation space, a vibration system accommodated in the accommodation space, an elastic member fixing and suspending the vibration system in the accommodation space, and a driving system fixed on the substrate and driving the vibration system to vibrate in a direction perpendicular to a horizontal direction. The vibration system includes a magnet; the driving system includes an iron core fixed on the substrate, a first coil and a second coil that are sleeved over and fixed on the iron core and that are stacked with each other, and an auxiliary magnet covering an end of the iron core.

6 Claims, 3 Drawing Sheets

LINEAR VIBRATION MOTOR

TECHNICAL FIELD

The present disclosure relates to a motor, more particular to a linear vibration motor applied to the field of mobile electronic products.

BACKGROUND

With the development of electronic technologies, portable consumer electronic products become more popular with people. The portable consumer electronic products, such as mobile phones, handheld game consoles, navigation apparatuses, and handheld multimedia entertainment devices generally use a linear vibration motor in system feedback, for example, in an incoming call prompt of a mobile phone, an information prompt, a navigation prompt, and vibration feedback of a game console. Such a wide range of application requires high performance of the vibration motor and a long service life.

A linear vibration motor in the related technologies includes a substrate having an accommodation space, a vibration system located in the accommodation space, an elastic member fixing and suspending the vibration system in the accommodation space, and a driving system fixed on the substrate. The driving system includes an iron core and a coil sleeved over the iron core. The vibration system includes a magnet, and the coil interacts with an electromagnetic field generated by the magnet to drive the vibration system to perform linear reciprocating motion to vibrate.

However, in a structure in which the linear vibration motor in the related technologies vibrates in a Z-axis direction, two ends of the iron core of the driving unit are exposed. A magnetic field is guided in the iron core and then returns back to an end of the magnet, and its loop is not restrained, that is, cannot pass through the coil efficiently. In this case, a driving force generated by the driving system is limited, that is, a force factor BL is small, and vibration performance of the linear vibration motor is affected.

Therefore, it is necessary to provide a new linear vibration motor to resolve the foregoing problem.

DETAILED DESCRIPTION

The present disclosure is further described below with reference to the accompanying drawings and the implementations.

Figure 1:
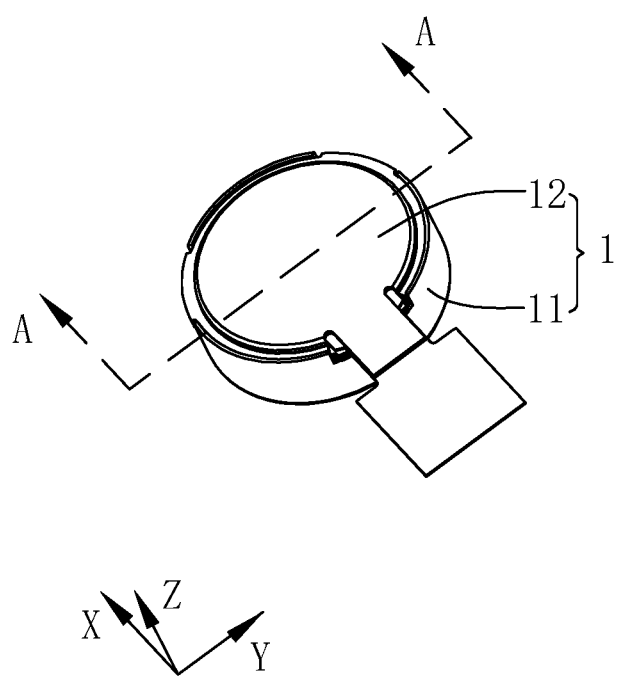
FIG. 1 is a three-dimensional schematic structural diagram of a linear vibration motor according to the present disclosure.
Figure 2:
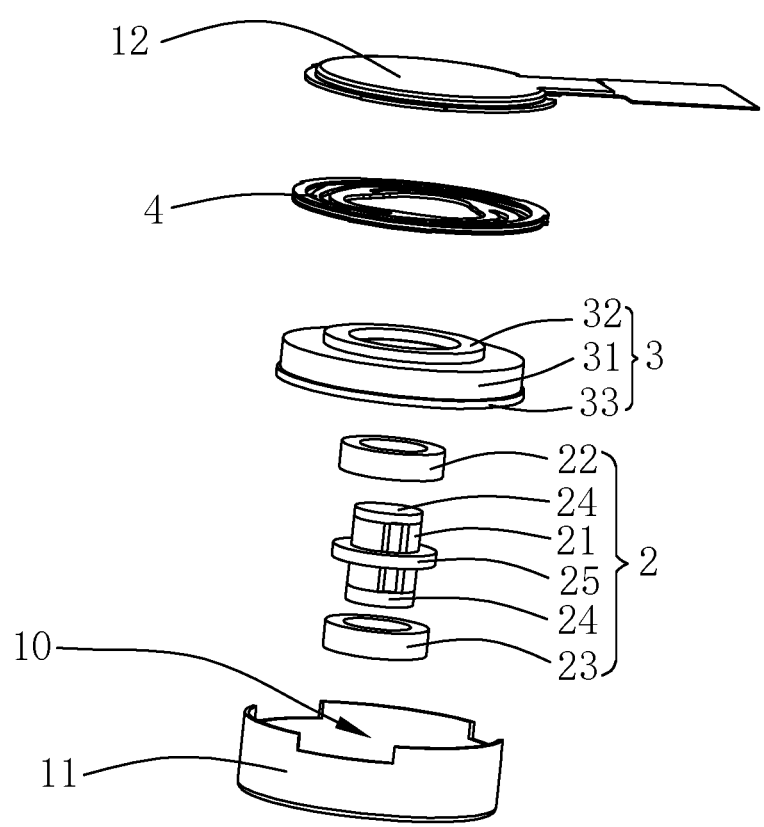
FIG. 2 is a partially exploded schematic structural diagram of a linear vibration motor according to the present disclosure.
Figure 3:
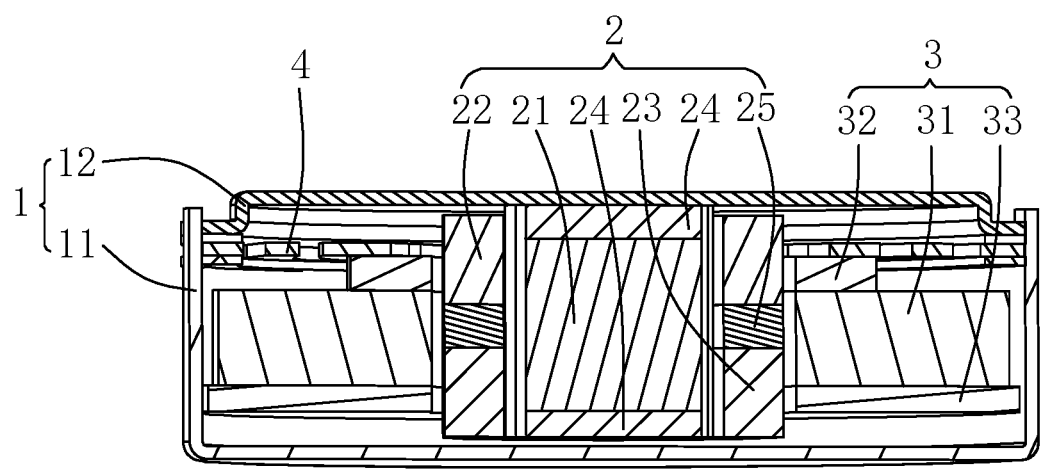
FIG. 3 is a schematic diagram of a section taken along an A-A line in FIG. 1.

Referring to FIG. 1 to FIG. 3, the present disclosure provides a linear vibration motor 100, including a substrate 1, a driving system 2, a vibration system 3, and an elastic member 4.

The substrate 1 includes a base 11 and a cover 12 covering the base 11, and the base 11 defines an accommodation space 10 together with the cover 12. The substrate 1 may have an integral structure or a split structure.

The driving system 2 is fixed on the substrate 1, and configured to drive the vibration system 3 to vibrate in a direction perpendicular to a horizontal direction, that is, perpendicular to a plane formed by the X-axis and the Y-axis shown in FIG. 1 to form vibration in a Z-axis direction.

In an implementation, the driving system 2 includes an iron core 21, a first coil 22, a second coil 23, and an auxiliary magnet 24.

The iron core 21 is fixed on the substrate 1, for example, fixed on the base 11. The configuration of the iron core 21 may improve a magnetic conductivity effect of a magnetic field to improve a driving force of the driving system 2, so as to provide a better vibration effect of the vibration system 3.

The first coil 22 and the second coil 23 are sleeved over and fixed on the iron core 21 and stacked with each other, and are sandwiched between the iron core 21 and the vibration system 3. A plane in which the first coil 22 and the second coil 23 are located is perpendicular to a vibration direction of the vibration system 3.

It should be noted that, the first coil 22 and the second coil 23 may be spaced apart from each other or abut against each other in insulation. The first coil 22 and the second coil 23 may be two independent coils or be of a two-coil structure wound by a same coil, which is feasible.

In an implementation, the first coil 22 and the second coil 23 are spaced apart from each other and a separation plate 25 is sandwiched between the first coil 22 and the second coil 23, and the separation plate 25 is sleeved over and fixed on the iron core 21. Specifically, the first coil 22 and the second coil 23 have opposite current direction.

The auxiliary magnet 24 covers an end of the iron core 21. There may be one auxiliary magnet 24, fixed on one end of the iron core 21; or there may be two auxiliary magnets 24, and one auxiliary magnet 24 is fixed on each of the two opposite ends of the iron core 21.

In an implementation, there are two auxiliary magnets 24, which are located at two opposite ends of the iron core 21 in the vibration direction, to form a magnetically conductive structure.

The vibration system 3 is disposed around the driving system 2, and in an implementation, the vibration system 3 includes a magnet 31, a first pole core 32, and a second pole core 33. The magnet 31 is magnetized in the vibration direction.

The magnet 31 is disposed around the drive system 2 and the magnet 31 and the driving system 2 are spaced apart from each other, to form a gap to provide a vibration space.

Specifically, the magnet 31 surrounds the first coil 22 and the second coil 23 at the same and is spaced apart from each other, and an orthographic projection of the magnetic 31 in the direction of the driving system 2 at least partially falls into the first coil 22 and the second coil 23. Configuration of this structure makes horizontal sub-magnets on the upper and lower sides of the magnet 31 pass through the first coil 22 and the second coil 23 to provide a Lorenz force, thereby achieving high utilization of the magnetic field. In addition, with reference to the setting of the auxiliary magnet 24, a magnetic field loop in the iron core 21 is guided to be more accurately magnetically conductive. Therefore, more magnetic lines of force pass through the first coil 22 and the second coil 23, horizontal turning efficiency of the magnetic field is effectively improved, a magnetic intensity of the magnetic loop is increased, and a force factor BL is maximized, thereby improving vibration performance of the linear vibration motor 100.

After passing through the first coil 22, the magnetic field passes through the iron core 21, and passes through the second coil 23 again after passing though the iron core 21. Therefore, the first coil 22 and the second coil 23 have opposite current directions, and generated Lorentz forces are in a same direction, thereby improving the vibration performance of the linear vibration motor 100 to extremely large extent.

The first pole core 32 and the second pole core 33 are stacked on the opposite sides of the magnet unit 31 along the vibration direction of the vibration system 3, and configured to be magnetically conductive, to reduce loss of the magnetic field of the magnet unit 31. For example, the first pole core 32 is fixed on one side of the magnet 31 along the vibration direction of the vibration system 3, and the second pole core 33 is fixed on one side of the magnet 31 away from the first pole core 32.

Certainly, only one of the first pole core 32 and the second pole core 33 may be set, which is also feasible.

The elastic member 4 fixes and suspends the vibration system 3 in the accommodation space 10, providing conditions for vibration of the vibration system 3. Specifically, the elastic member 4 is fixed on the first core 32, so as to suspend the vibration system 3.

In an implementation, the elastic member 4 has a ring-shaped structure, and is fixed on one side of the base 11 close to the cover 12.

Compared with the related technologies, the driving system of the linear vibration motor in the present disclosure includes an iron core fixed on the substrate, a first coil and a second coil that are sleeved over and fixed on the iron core and that are stacked with each other, and an auxiliary magnet covering an end of the iron core, so that the magnet is disposed around the driving system and the magnet and the driving system are spaced apart from each other. In the structure, the auxiliary magnet is added, so that a magnetic field loop in the iron core is guided to be more accurately magnetically conductive. Therefore, more magnetic lines of force pass through the first coil and the second coil, horizontal turning efficiency of the magnetic field is effectively improved, and a magnetic intensity of the magnetic loop is increased, that is, a magnetic field is fully used to improve a force factor BL, thereby improving a Lorentz force and effectively improving vibration performance of the linear vibration motor.

The foregoing descriptions are merely embodiments of the present disclosure, and the patent scope of the present disclosure is not limited thereto. All equivalent structure or process changes made according to the content of this specification and accompanying drawings in the present disclosure or by directly or indirectly applying the present disclosure in other related technical fields shall fall within the patent protection scope of the present disclosure.

What is claimed is:

1. A linear vibration motor, comprising a substrate having an accommodation space, a vibration system accommodated in the accommodation space, an elastic member fixing and suspending the vibration system in the accommodation space, and a driving system fixed on the substrate and driving the vibration system to vibrate in a direction perpendicular to a horizontal direction, wherein the vibration system comprises a magnet;

the driving system comprises an iron core, a first coil and a second coil that are sleeved over and fixed on the iron core and that are stacked with each other, and an auxiliary magnet covering an end of the iron core and fixed on the substrate;

the magnet is disposed around the driving system and the magnet and the driving system are spaced apart from each other; and an orthographic projection of the magnet in a direction of the driving system at least partially falls within the first coil and the second coil.

2. The linear vibration motor according to claim 1, wherein there are two auxiliary magnets, and each of two opposite ends of the iron core is provided with one auxiliary magnet along a vibration direction.

3. The linear vibration motor according to claim 1, wherein the driving system further comprises a separation plate sleeved over and fixed on the iron core, and the separation plate is sandwiched between the first coil and the second coil.

4. The linear vibration motor according to claim 1, wherein the vibration system further comprises a first pole core, and the first pole core is fixed at one side of the magnet along a vibration direction of the vibration system.

5. The linear vibration motor according to claim 4, wherein the vibration system further comprises a second pole core, and the second pole core is fixed at one side of the magnet away from the first pole core.

6. The linear vibration motor according to claim 5, wherein the elastic member is fixed on one side of the first pole core away from the magnet.

\* \* \* \* \*